US012745023B2

(12) United States Patent
Hoshida et al.

(10) Patent No.: US 12,745,023 B2
(45) Date of Patent: Sep. 22, 2026

(54) OPTICAL NODE DEVICE, OPTICAL COMMUNICATION SYSTEM, AND WAVELENGTH CONVERSION CIRCUIT

(71) Applicant: Fujitsu Limited, Kawasaki (JP)

(72) Inventors: Takeshi Hoshida, Kawasaki (JP); Yu Tanaka, Kawasaki (JP)

(73) Assignee: 1FINITY, Kawasaki (JP)

( * ) Notice: Subject to any disclaimer, the term of this patent is extended or adjusted under 35 U.S.C. 154(b) by 367 days.

(21) Appl. No.: 18/242,175

(22) Filed: Sep. 5, 2023

(65) Prior Publication Data

US 2024/0179439 A1 May 30, 2024

(30) Foreign Application Priority Data

Nov. 29, 2022 (JP) ................................ 2022-190014

(51) Int. Cl.
*H04Q 11/00* (2006.01)

(52) U.S. Cl.
CPC .. *H04Q 11/0005* (2013.01); *H04Q 2011/0011* (2013.01); *H04Q 2011/0016* (2013.01)

(58) Field of Classification Search
CPC ........ H04Q 11/0005; H04Q 2011/0011; H04Q 2011/0016
USPC .......................................................... 385/16
See application file for complete search history.

(56) References Cited

U.S. PATENT DOCUMENTS

2006/0062577 A1* 3/2006 Miura ................. H04J 14/0205 398/82
2007/0092248 A1* 4/2007 Jennen ................ H04J 14/0212 398/45
2018/0063607 A1* 3/2018 Xia ......................... H04J 14/04
2021/0013985 A1 1/2021 Shibahara et al.
2021/0296847 A1 9/2021 Mizuno et al.
2022/0357516 A1* 11/2022 Kadar-Kallen .......... G02B 6/34

FOREIGN PATENT DOCUMENTS

JP 2019-154004 9/2019
WO WO 2020/013096 A1 1/2020

* cited by examiner

*Primary Examiner* — Jerry M Blevins
(74) *Attorney, Agent, or Firm* — STAAS & HALSEY LLP

(57) ABSTRACT

An optical node device includes: an optical switch coupled to a multicore fiber that has N (N is an integer of 2 or more) cores; a multiplexer-demultiplexer coupled to a single-core fiber that multiplexes and transmits optical signals in M (M is an integer of 2 or more; and M≤N) bands; a maximum of (M−1) wavelength converters provided between the optical switch and the multiplexer-demultiplexer; and a control circuit that controls the optical switch, the wavelength converter or both of the optical switch and the wavelength converter and the control circuit controls the optical switch or the wavelength converter or both of the optical switch and the wavelength converter such that, of the optical signals in the M bands, an optical signal in at least one band is not subject to wavelength conversion and an optical signal in another band is subject to the wavelength conversion.

12 Claims, 15 Drawing Sheets

1
10A
OPTICAL NODE DEVICE
FROM NODE A
60
12
OSW
13-1
C→S
13-2
C→L
13-3
C→U
15
MUX
70
TO NODE B
18
17
CONTROL CIRCUIT
C-BAND
ONE BAND × N CORES
WAVELENGTH
S-BAND
C-BAND
L-BAND
U-BAND
M BANDS × ONE CORE
WAVELENGTH
100
NETWORK CONTROLLER

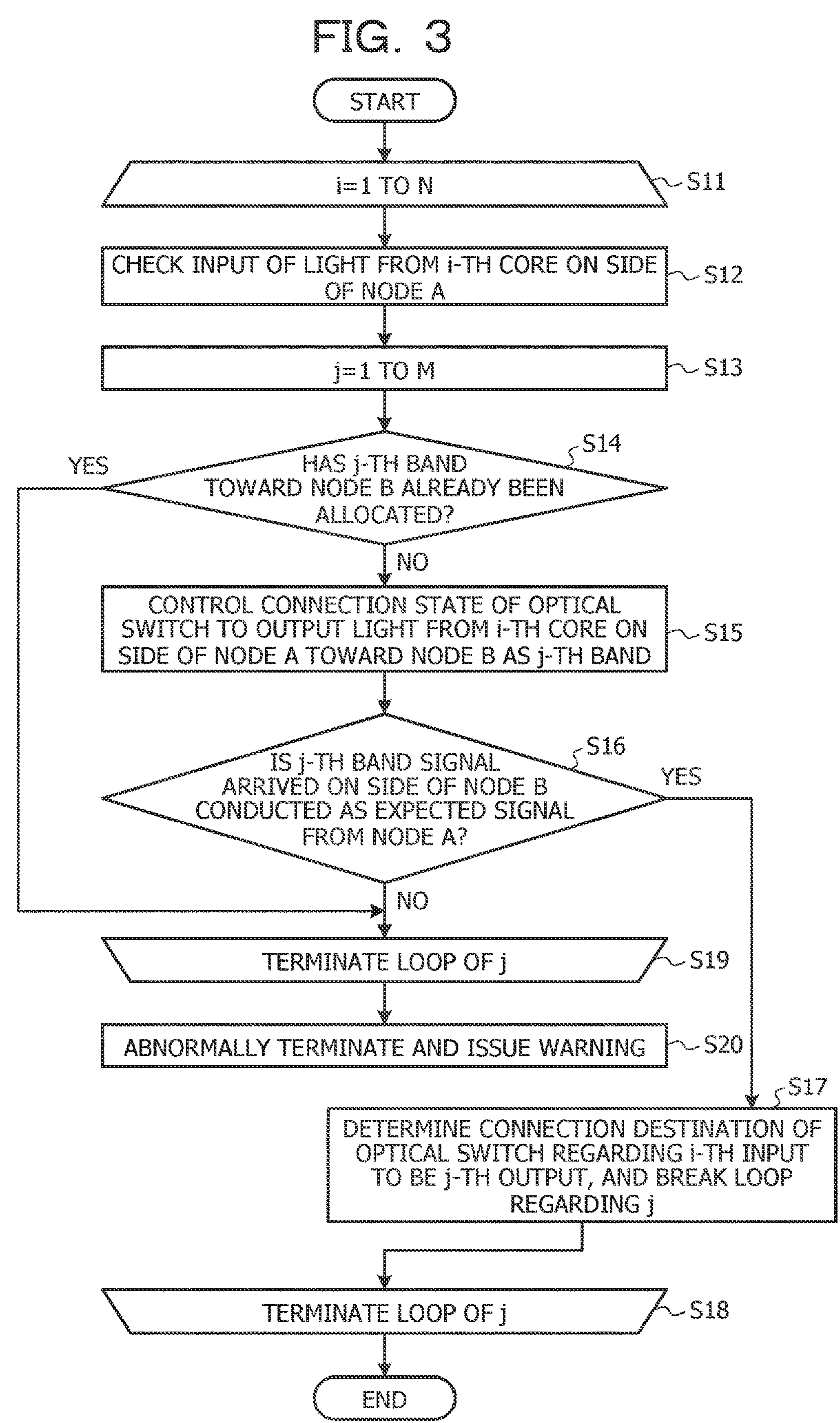
FIG. 3
START
i=1 TO N
S11
CHECK INPUT OF LIGHT FROM i-TH CORE ON SIDE OF NODE A
S12
j=1 TO M
S13
HAS j-TH BAND TOWARD NODE B ALREADY BEEN ALLOCATED?
S14
YES
NO
CONTROL CONNECTION STATE OF OPTICAL SWITCH TO OUTPUT LIGHT FROM i-TH CORE ON SIDE OF NODE A TOWARD NODE B AS j-TH BAND
S15
IS j-TH BAND SIGNAL ARRIVED ON SIDE OF NODE B CONDUCTED AS EXPECTED SIGNAL FROM NODE A?
S16
YES
NO
TERMINATE LOOP OF j
S19
ABNORMALLY TERMINATE AND ISSUE WARNING
S20
DETERMINE CONNECTION DESTINATION OF OPTICAL SWITCH REGARDING i-TH INPUT TO BE j-TH OUTPUT, AND BREAK LOOP REGARDING j
S17
TERMINATE LOOP OF j
S18
END

FIG. 4

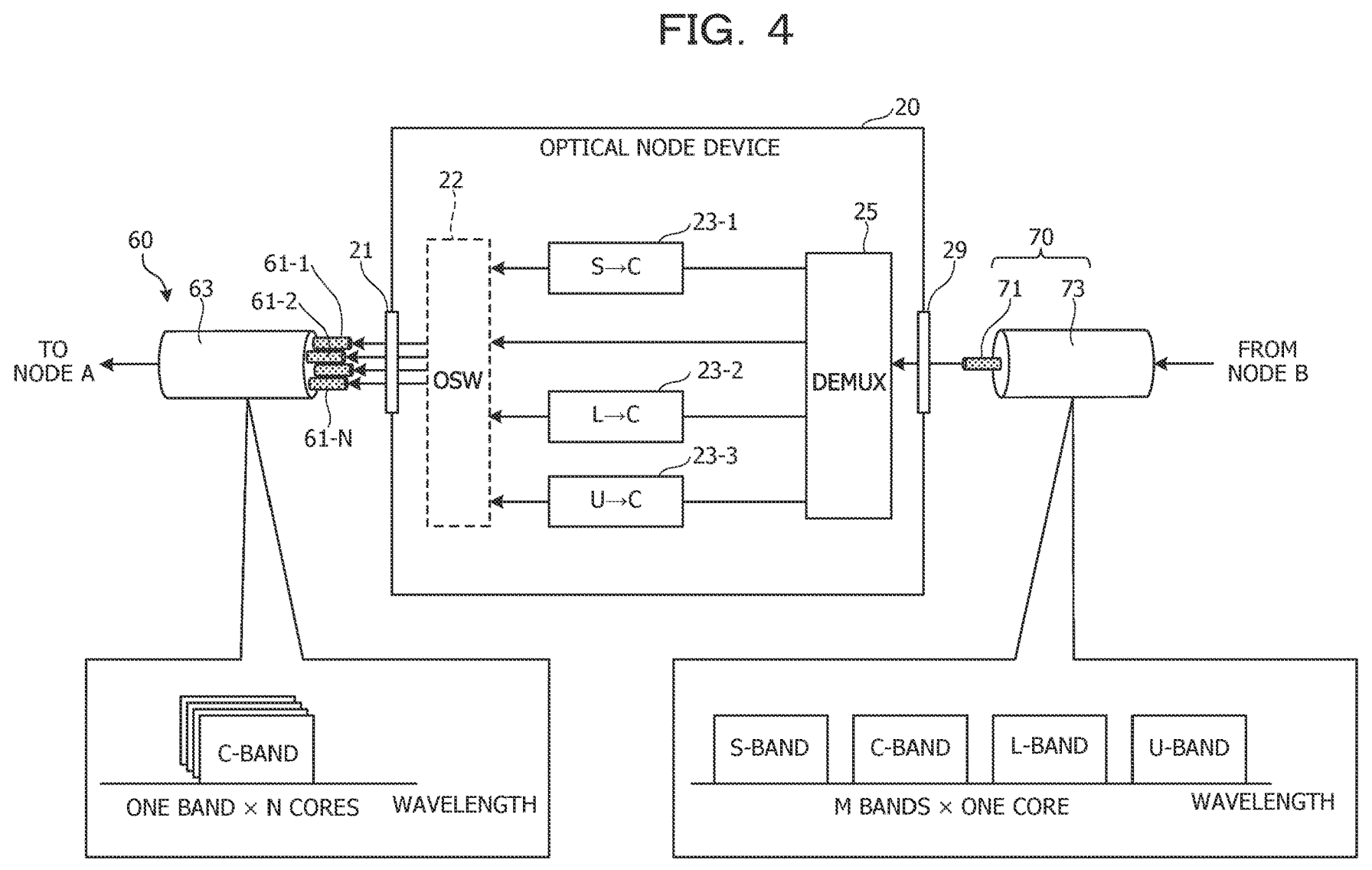

FROM NODE B 70
71
73
29
20
OPTICAL NODE DEVICE
25
DEMUX
23-1
S→C
23-2
L→C
23-3
U→C
22
OSW
21
61-1
61-2
61-N
63
60
TO NODE A

S-BAND
C-BAND
L-BAND
U-BAND
M BANDS × ONE CORE
WAVELENGTH

C-BAND
ONE BAND × N CORES
WAVELENGTH

2
OPTICAL NODE DEVICE
20A
FROM NODE B
TO NODE A
70
60
25
DEMUX
28
27
CONTROL CIRCUIT
S→C
L→C
U→C
23-1
23-2
23-3
22
OSW
61-1
61-2
61-3
61-N
S-BAND
C-BAND
L-BAND
U-BAND
M BANDS × ONE CORE
WAVELENGTH
C-BAND
ONE BAND × N CORES
WAVELENGTH
100
NETWORK CONTROLLER

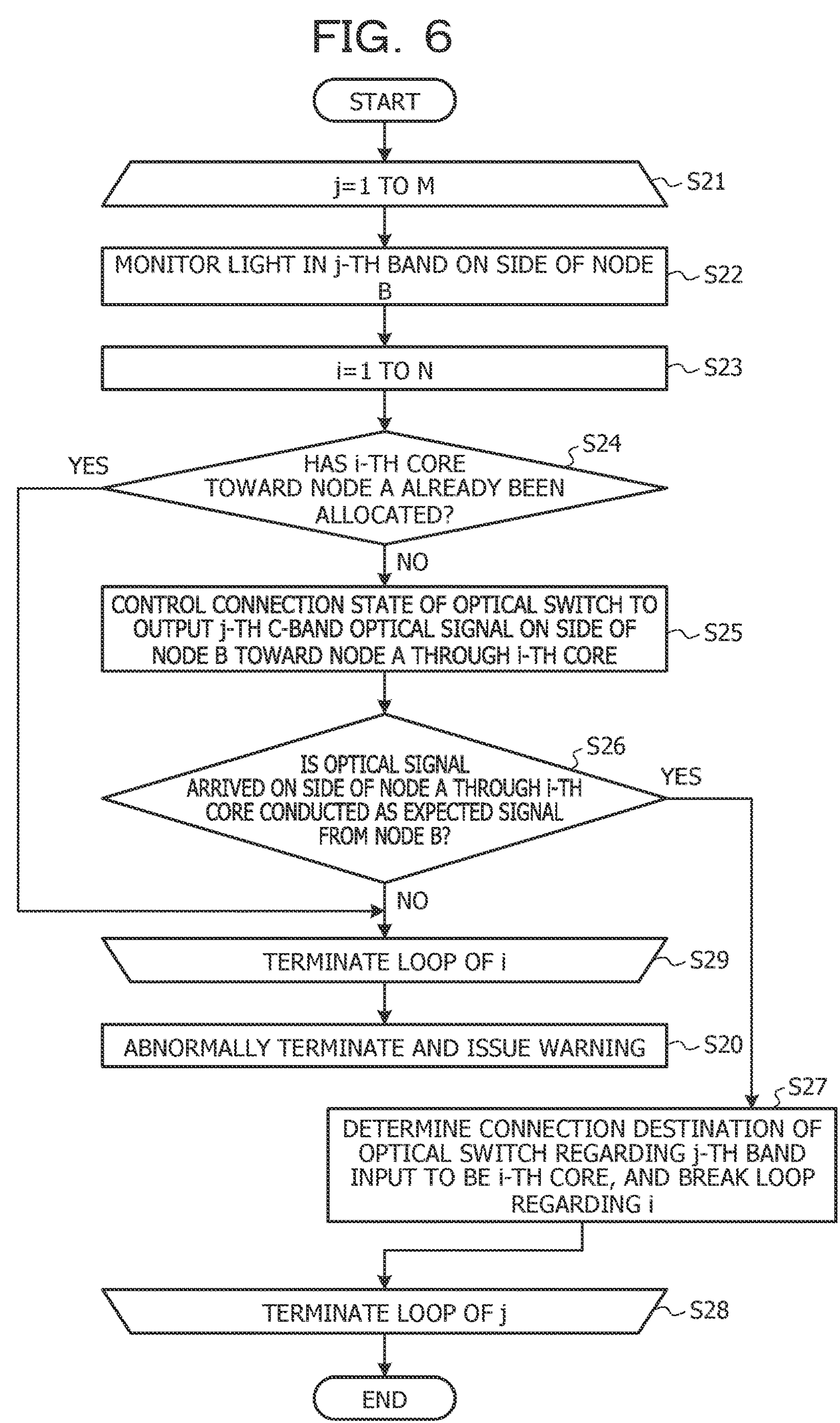
FIG. 6
START
j=1 TO M
S21
MONITOR LIGHT IN j-TH BAND ON SIDE OF NODE B
S22
i=1 TO N
S23
HAS i-TH CORE TOWARD NODE A ALREADY BEEN ALLOCATED?
S24
YES
NO
CONTROL CONNECTION STATE OF OPTICAL SWITCH TO OUTPUT j-TH C-BAND OPTICAL SIGNAL ON SIDE OF NODE B TOWARD NODE A THROUGH i-TH CORE
S25
IS OPTICAL SIGNAL ARRIVED ON SIDE OF NODE A THROUGH i-TH CORE CONDUCTED AS EXPECTED SIGNAL FROM NODE B?
S26
YES
NO
TERMINATE LOOP OF i
S29
ABNORMALLY TERMINATE AND ISSUE WARNING
S20
DETERMINE CONNECTION DESTINATION OF OPTICAL SWITCH REGARDING j-TH BAND INPUT TO BE i-TH CORE, AND BREAK LOOP REGARDING i
S27
TERMINATE LOOP OF j
S28
END C-
BAND
ONE BAND × N CORES WAVELENGTH
S-BAND
C-BAND
L-BAND
U-BAND
M BANDS × ONE CORE
WAVELENGTH
3
30A
OPTICAL NODE DEVICE
32A
C-BAND PORT
S-BAND PORT
35
C↔S
33-1
60
61-1
61-2
71
70
TO NODE A
OSW
MUX/DEMUX
FROM NODE B
C-BAND PORT
33-2
L-BAND PORT
C↔L
61-N
C-BAND PORT
U-BAND PORT
C↔U
33-3
18
INPUT/OUTPUT SWITCHING SETTING SIGNAL
28
CONTROL CIRCUIT
37A
100
NETWORK CONTROLLER

Figure 8:
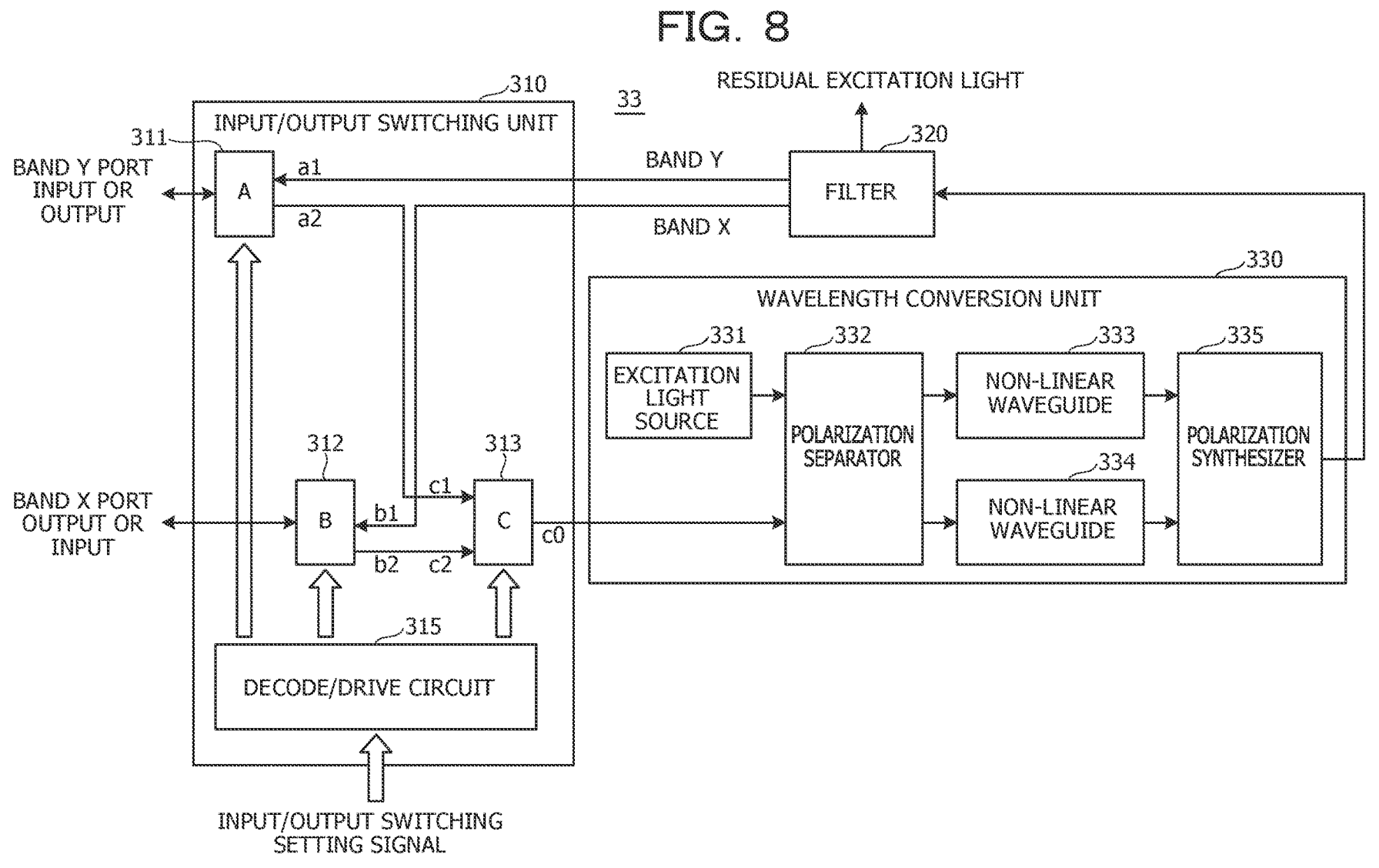

RESIDUAL EXCITATION LIGHT

320 FILTER

BAND Y

BAND X

330 WAVELENGTH CONVERSION UNIT

331 EXCITATION LIGHT SOURCE

332 POLARIZATION SEPARATOR

333 NON-LINEAR WAVEGUIDE

334 NON-LINEAR WAVEGUIDE

335 POLARIZATION SYNTHESIZER

310 INPUT/OUTPUT SWITCHING UNIT

311 A

312 B

313 C

315 DECODE/DRIVE CIRCUIT a1 a2 b1 b2 c1 c2 c0

BAND Y PORT INPUT OR OUTPUT

BAND X PORT OUTPUT OR INPUT

INPUT/OUTPUT SWITCHING SETTING SIGNAL

FIG. 9

| INPUT/OUTPUT SWITCHING SETTING | 2 × 1 OPTICAL SWITCH A | 2 × 1 OPTICAL SWITCH B | 2 × 1 OPTICAL SWITCH C |
|---|---|---|---|
| BAND X: INPUT, BAND Y: OUTPUT | SET TO COUPLE PORT a1 WITH BAND Y PORT | SET TO COUPLE PORT b2 WITH BAND X PORT | SET TO COUPLE PORT c2 WITH PORT c0 |
| BAND X: OUTPUT, BAND Y: INPUT | SET TO COUPLE PORT a2 WITH BAND Y PORT | SET TO COUPLE PORT b1 WITH BAND X PORT | SET TO COUPLE PORT c1 WITH PORT c0 |

FIG. 13

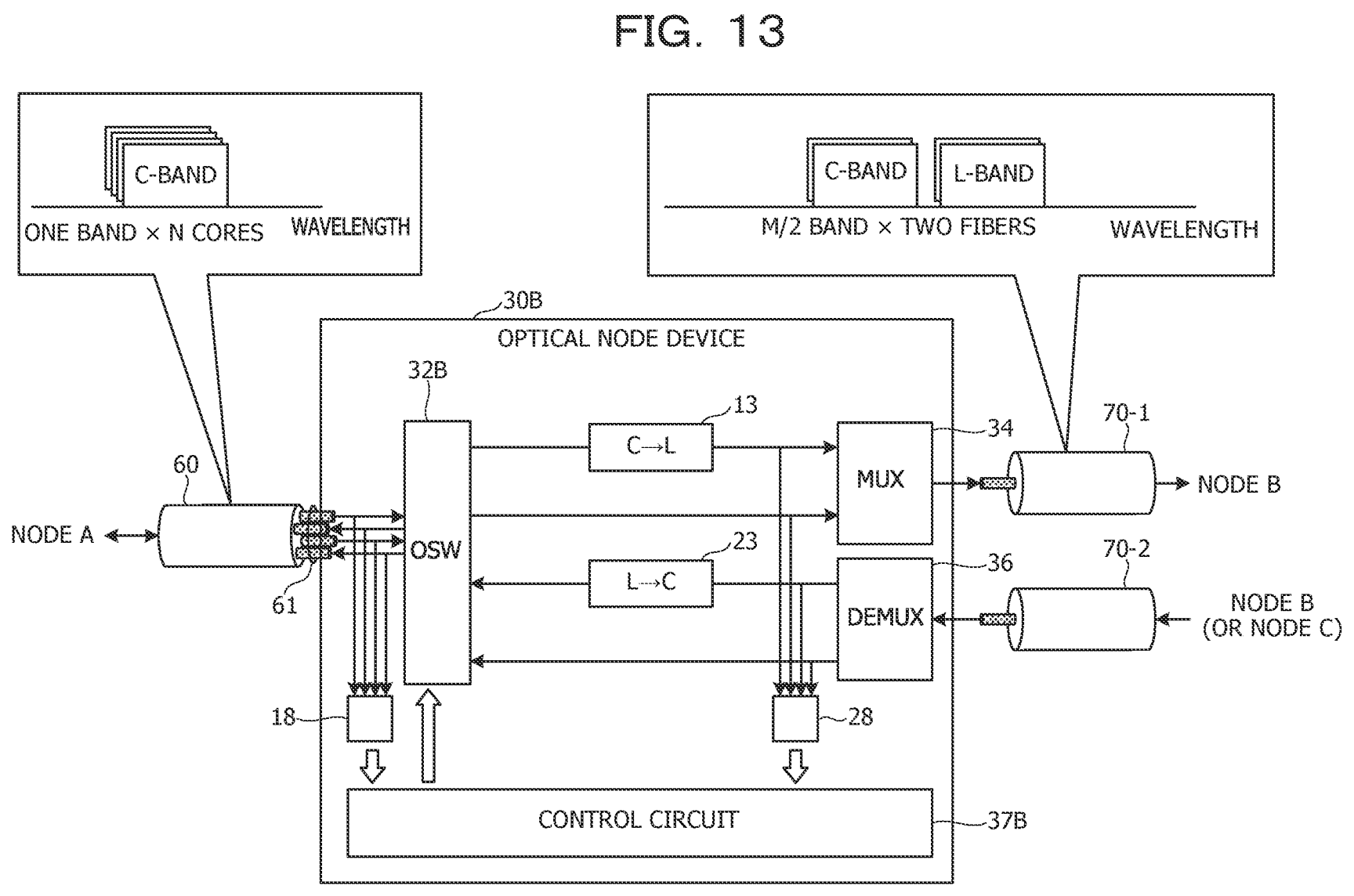

ONE BAND × N CORES
C-BAND
WAVELENGTH
M/2 BAND × TWO FIBERS
C-BAND
L-BAND
WAVELENGTH
NODE A
60
61
18
30B
OPTICAL NODE DEVICE
32B
OSW
13
C→L
23
L→C
28
34
MUX
36
DEMUX
37B
CONTROL CIRCUIT
70-1
NODE B
70-2
NODE B
(OR NODE C)

FIG. 14

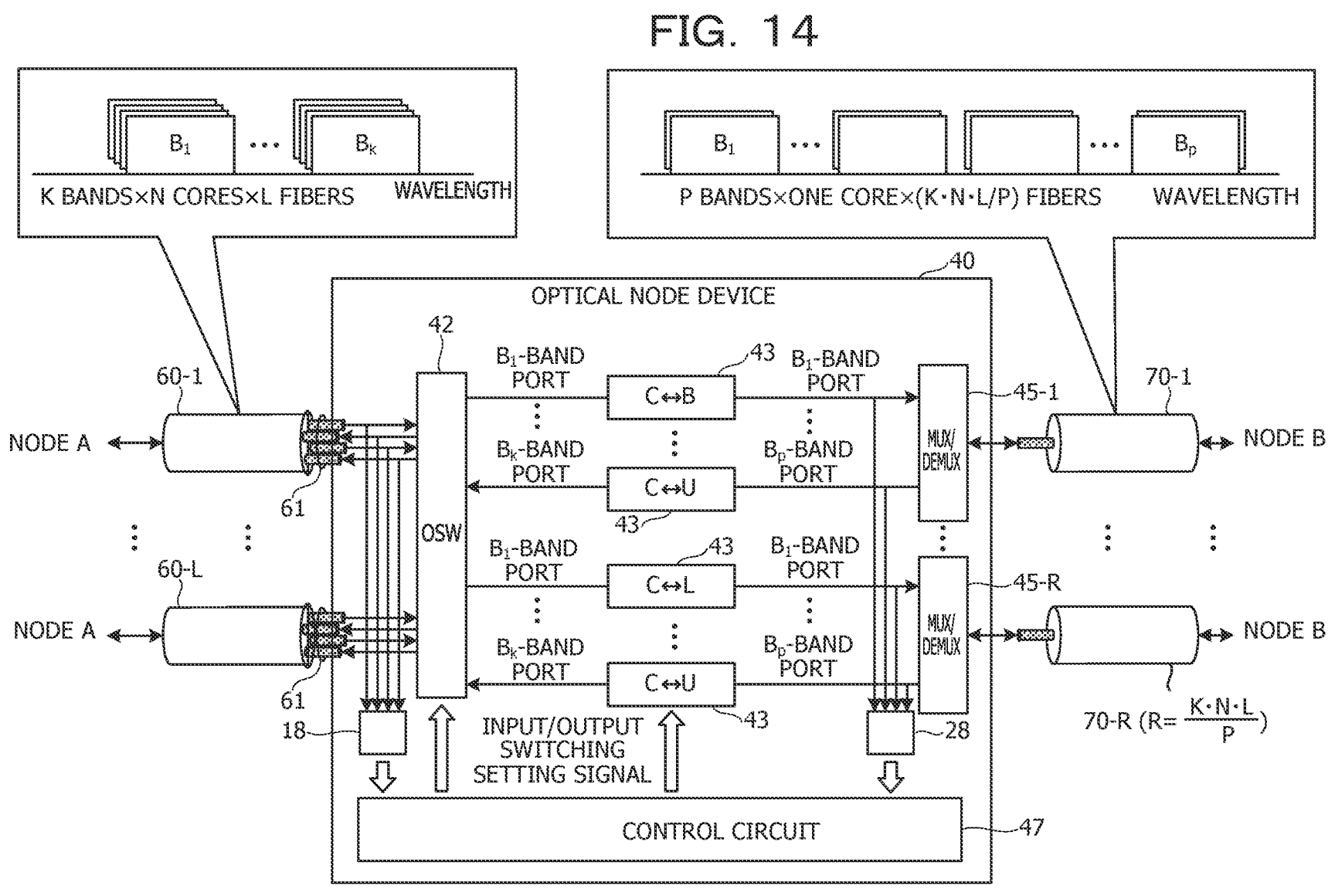

K BANDS×N CORES×L FIBERS $B_1$ … $B_K$ WAVELENGTH

P BANDS×ONE CORE×(K·N·L/P) FIBERS $B_1$ … … $B_p$ WAVELENGTH

NODE A

NODE A 60-1

60-L

61

61

18

OPTICAL NODE DEVICE

40

42

OSW $B_1$-BAND PORT $B_K$-BAND PORT $B_1$-BAND PORT $B_K$-BAND PORT

43

C↔B

C↔U

C↔L

C↔U $B_1$-BAND PORT $B_p$-BAND PORT $B_1$-BAND PORT $B_p$-BAND PORT

MUX/DEMUX

MUX/DEMUX 45-1

45-R

28

47

INPUT/OUTPUT SWITCHING SETTING SIGNAL

CONTROL CIRCUIT 70-1

70-R $\left(R=\frac{K \cdot N \cdot L}{P}\right)$

NODE B

NODE B

OPTICAL NODE DEVICE
50
FROM NODE A
60
61
11
52
OSW
58-1
58-2
58-3
58-4
53-1
C↔S
53-2
C↔L
53-3
C↔U
55
MUX
19
70
TO NODE B, ETC.
PATH SETTING DEVICE (MCS or MIMO-WSS)
57
80-1
80-2
80-Q
C-BAND
ONE BAND × N CORES
WAVELENGTH
S-BAND
C-BAND
L-BAND
U-BAND
M BANDS×ONE CORE
WAVELENGTH

OPTICAL NODE DEVICE, OPTICAL COMMUNICATION SYSTEM, AND WAVELENGTH CONVERSION CIRCUIT

CROSS-REFERENCE TO RELATED APPLICATION

This application is based upon and claims the benefit of priority of the prior Japanese Patent Application No. 2022-190014, filed on Nov. 29, 2022, the entire contents of which are incorporated herein by reference.

FIELD

The present disclosure discussed herein is related to an optical node device, an optical communication system, and a wavelength conversion circuit.

BACKGROUND

Densification of wavelength division multiplexing (WDM) transmission and high multilevel modulation schemes have been in progress to cope with the increasing communication capacity. There is also a limit to the expansion of the communication capacity by those techniques, and there is an increasing interest in space division multiplexing (SDM) transmission as a new transmission scheme.

International Publication Pamphlet No. WO 2020/013096 and Japanese Laid-open Patent Publication No. 2019-154004 are disclosed as related art.

SUMMARY

According to an aspect of the embodiments, an optical node device includes: an optical switch coupled to a multi-core fiber that has N (N is an integer of 2 or more) cores; a multiplexer-demultiplexer coupled to a single-core fiber that multiplexes and transmits optical signals in M (M is an integer of 2 or more; and M≤N) bands; a maximum of (M−1) wavelength converters provided between the optical switch and the multiplexer-demultiplexer; and a control circuit that controls the optical switch or the wavelength converter or both of the optical switch and the wavelength converter and the control circuit controls the optical switch or the wavelength converter or both of the optical switch and the wavelength converter such that, of the optical signals in the M bands, an optical signal in at least one band is not subject to wavelength conversion and an optical signal in another band is subject to the wavelength conversion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart of optical switch control according to the first embodiment;

FIG. 4 is a schematic diagram of an optical node device according to a second embodiment;

FIG. 6 is a flowchart of optical switch control according to the second embodiment;

FIG. 8 is a schematic diagram of a wavelength converter to be used in the system of FIG. 7;

FIG. 9 is a diagram illustrating an exemplary setting of input/output switching of the wavelength converter in FIG. 8;

FIG. 13 is a diagram illustrating a first variation of bidirectional optical transmission between an SDM section and a non-SDM section;

FIG. 14 is a diagram illustrating a second variation of the bidirectional optical transmission between the SDM section and the non-SDM section.

DESCRIPTION OF EMBODIMENTS

Figure 1:
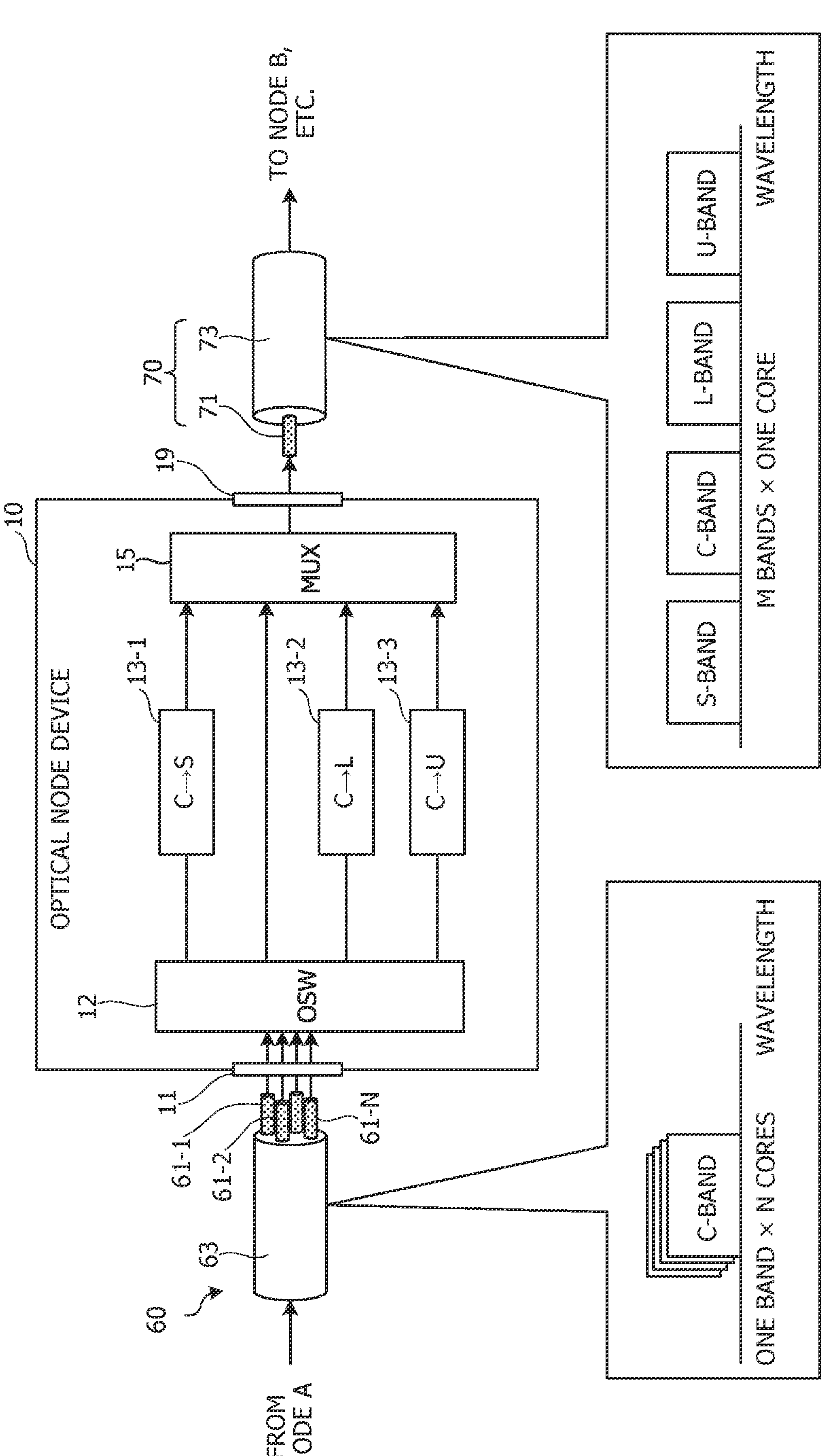
FIG. 1 is a schematic diagram of an optical node device according to a first embodiment.

Spatial multiplexing includes multimode transmission using a plurality of modes propagating in one core as transmission channels and multicore fiber transmission using a plurality of cores passing through one optical fiber as transmission channels. Multicore and multimode fibers combining the multimode transmission and the multicore transmission have also been under study. The use of spatial multiplexing techniques enables higher capacity transmission with limited cable cross-sectional area. Furthermore, connection to a front panel of an optical communication device, which has limited area, may be established with a smaller number of connectors.

It takes cost and time to replace a single-core fiber used in a WDM transmission network with a multicore fiber, and it is expected that a considerable time is needed to completely transition to a multicore fiber network. For the time being, it is considered that a space division multiplexing (SDM) section using a multicore fiber and a non-SDM section using a single-core fiber are mixed in an optical network. In this case, a measure for seamlessly coupling large-capacity optical signals at a boundary between the space division multiplexing (SDM) section and the non-SDM section is needed.

According to embodiments, an optical node device that converts an optical signal into a form suitable for transmission in each of an SDM section and a non-SDM section at a boundary thereof, and an optical communication system using the optical node device are provided.

According to embodiments, an optical node device that converts an optical signal between an SDM section and a non-SDM section into a state suitable for a transmission scheme of each of the sections, an optical communication system using the optical node device, and a wavelength conversion circuit are provided. A transmission medium is different between the SDM section using a multicore fiber (MCF) and the non-SDM section using an existing single-core fiber (SCF). The optical node device may be called a “media converter” as it mutually converts optical signals propagating different transmission media.

For example, it is conceivable that a core network that links areas separated from each other is first replaced with the MCF, and then replacement with the MCF is sequentially carried out in a metro network. Interconnection between the MCF and the SCF is needed at a joint between the core network and the metro network until the installation of the MCF in the metro network is complete. It is desirable to transmit optical signals in the same band (e.g., C-band) with N (N is an integer of 2 or more) cores included in one MCF to achieve high-speed and large-capacity long-distance communication while minimizing equipment investment and operational costs in the SDM section. It is commonly conceivable to fan out the core of the MCF at the boundary between the SDM section and the non-SDM section to couple to N SCFs. However, this method needs a very large number of SCFs in the metro network.

In order to achieve the interconnection with the MCF using the existing SCF in the metro network, it is efficient to perform wavelength conversion of some of the optical signals in the same band transmitted by the N cores of the MCF into optical signals in a different band, multiplex the optical signals having been subject to the wavelength conversion and the optical signals not having been subject to the wavelength conversion, and enter the multiplexed signals into the SCF. The inventors have proposed the optical node device and the optical communication system according to the embodiments based on this new concept.

Hereinafter, specific configurations of the optical node device, the optical communication system, and the wavelength conversion circuit according to the embodiments will be described. The following modes are examples for embodying the technical idea of the present disclosure, and do not limit the contents of the disclosure. Sizes, positional relationships, and the like of components illustrated in the individual drawings may be illustrated in an exaggerated manner to facilitate understanding of the embodiments. The same component or function may be denoted by the same name or reference sign, and redundant description may be omitted.

First Embodiment

FIG. 1 is a schematic diagram of an optical node device 10 according to a first embodiment. In the first embodiment, an optical signal is coupled from an SDM section to a non-SDM section. The optical node device 10 is coupled between an MCF 60 having N (N is an integer of 2 or more) cores 61-1, 61-2, . . . , and 61-N (hereinafter collectively referred to as "cores 61" as appropriate) and an SCF 70 having one core 71. The N cores 61 are disposed at predetermined intervals to minimize inter-core interference, and are separated from each other by a clad 63. It is assumed that individual WDM signals using the same band (e.g., C-band) propagate through the N cores 61. The optical signal transmitted from a node A through the MCF 60 by spatial multiplexing is converted into an optical signal suitable for transmission through the SCF 70 by the optical node device 10, and enters the SCF 70.

The optical node device 10 converts the N sets of optical signals transmitted through the N cores 61 into M (M is an integer of 2 or more) optical signals in different bands, and multiplexes the optical signals in the different bands. The values of M and N may be the same, or N may be smaller than M. In the example of FIG. 1, N=4 and M=4. In order to generate optical signals in M bands, the optical node device 10 includes a maximum of (M−1) wavelength converters 13-1, 13-2, and 13-3. Among four sets of C-band optical signals propagated through the four cores 61, three sets of optical signals are converted into S-band, L-band, and U-band optical signals by the wavelength converters 13-1, 13-2, and 13-3 (hereinafter collectively referred to as "wavelength converters 13" as appropriate), respectively. The (M−1) optical signals having been subject to the wavelength conversion are multiplexed by a multiplexer (denoted by "MUX" in the drawing) 15 together with C-band optical signals not having been subject to the wavelength conversion, and enter the core 71 of the SCF 70. The SCF 70 extends in the direction of the node B or another node.

As a principle of the wavelength conversion between the C-band and the S-band and between the C-band and the L-band, various methods have already been demonstrated. The wavelength conversion between the C-band and the U-band needs an excitation light source on a longer wavelength side. Although there is no demonstration example of the wavelength conversion between the C-band and the U-band, it may be achieved by highly accurately controlling output power of the excitation light source and performing phase matching in a non-linear medium. The wavelength conversion between the C-band and the U-band is advantageous in that it is easier to obtain an excitation light source having high output and a narrow line width as compared with the wavelength conversion between the L-band and the U-band. For example, periodically poled lithium niobate (PPLN; periodically poled reversal LN) is used as a non-linear medium, and its second-order non-linearity is utilized. It is conceivable to adopt, as an excitation light source, a configuration in which light of an excitation light source having an L-band narrow line width is amplified and the amplified light is converted into a band around 780 nm by second harmonic generation (SHG). The L-band excitation light source may be amplified by an erbium-doped optical fiber amplifier (EDFA), a semiconductor optical amplifier (SOA), or the like.

The optical node device 10 may include an optical connector 11 on the incident side, an optical switch (denoted by "OSW" in the drawing) 12, and an optical connector 19 on the emission side. The optical connector 11 may include a fan-out component that separates the N cores 61 into N single-core fibers. In this case, the N sets of optical signals enter the optical switch 12 through the N single-core fibers. The N cores 61 of the MCF 60 may be fanned out to be directly coupled to the input of the optical switch 12 without using the optical connector 11. Alternatively, the optical switch 12 may include a fan-out function that couples the output light to the N single-core fibers.

The optical switch 12 makes a selection regarding which of the wavelength converters 13-1, 13-2, and 13-3 each of the N sets of optical signals is made incident on. For example, the connection relation may be selected in such a manner that wavelength conversion is not applied to an optical signal to be transmitted to a distant node. Each optical signal whose connection destination is determined by the optical switch 12 enters the multiplexer 15 to be multiplexed through the wavelength conversion or without being subject to the wavelength conversion. The optical connector 19 on the emission side couples the optical signals output from the multiplexer 15 to the core 71 of the SCF 70.

With the configuration of FIG. 1, it becomes possible to seamlessly couple the optical signals at the boundary between the SDM section using the MCF 60 and the non-SDM section using the SCF 70.

Figure 2:
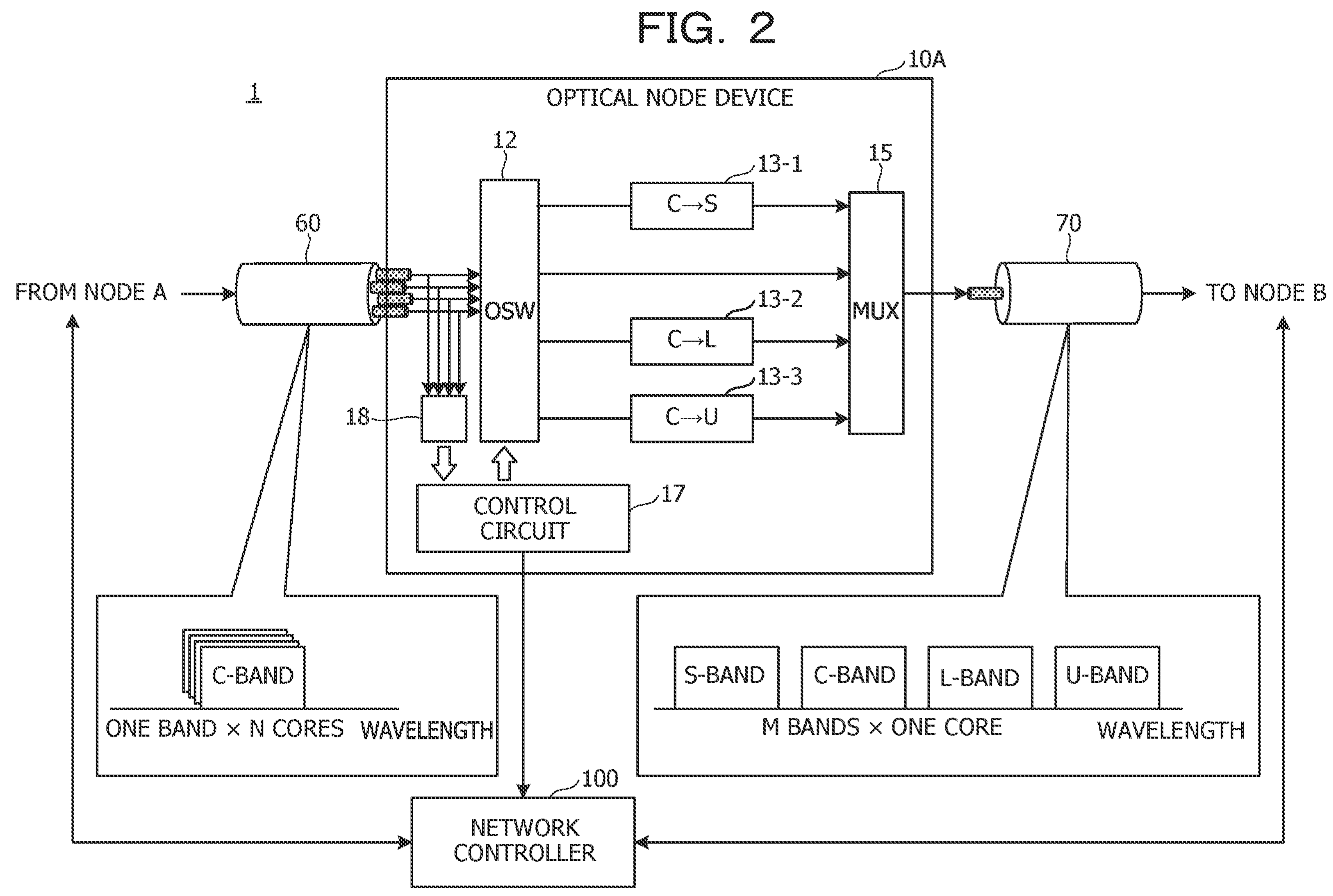
FIG. 2 is a schematic diagram of an optical communication system according to the first embodiment.

FIG. 2 is a schematic diagram of an optical communication system 1 according to the first embodiment. The optical communication system 1 includes an optical node device 10A and a network controller 100. The network controller 100 is coupled to each of nodes included in the optical communication system 1, for example, a node A, a node B, and the optical node device 10A. The optical node device 10A transfers optical signals from the SDM section to the non-SDM section in a similar manner to the optical node device 10 in FIG. 1. In the drawing, solid line arrows indicate input/output of light, and white arrows indicate input/output of electricity.

The optical node device 10A is coupled between the MCF 60 including the N cores 61 (see FIG. 1) and the SCF 70 that transmits optical signals in which signals of M bands are multiplexed. The optical node device 10A includes, in addition to the optical switch 12, the (M−1) wavelength converters 13, and the multiplexer 15, a control circuit 17 that controls the optical switch 12, and an optical monitor 18. The control circuit 17 is implemented by a microprocessor, a field programmable gate array (FPGA), another logic device, or an integrated circuit device. Each of those processors and logic devices may include a built-in memory, or may be mounted on a package substrate together with a memory.

The optical monitor 18 has a function of measuring power of optical signals arrived from each core of the MCF 60 to the optical node device 10A. In this example, the MCF 60 includes four cores 61, and the optical monitor 18 includes four photodiodes (PDs) as photodetectors. One detector with 4×1 optical switches may be combined to sequentially monitor the power of the optical signals that arrive at each core while switching the optical switches. Here, the three wavelength converters 13-1, 13-2, and 13-3 are used on the assumption of four bands.

The N optical signals in the same band enter the optical switch 12. At least one of the four outputs of the optical switch 12 directly enters the multiplexer 15 without being subject to the wavelength conversion. The remaining optical signals are subject to the wavelength conversion by the corresponding wavelength converters 13, and then enter the multiplexer 15. The multiplexer 15 multiplexes the optical signals not having been subject to the wavelength conversion and the optical signals converted into different bands by the individual wavelength converters 13. The output light from the multiplexer 15 is optical signals in which optical signals in different bands are multiplexed, and is made incident on the SCF 70.

The optical monitor 18 monitors the power of each optical signal incident on the optical switch 12, and supplies a monitoring result to the control circuit 17. The control circuit 17 controls the operation of the optical switch 12 based on the monitoring result of the optical monitor 18 and node information obtained from the network controller 100. Under the control of the control circuit 17, it is determined which optical signal of the N sets of optical signals is coupled to which of the wavelength converters 13, and which optical signal is directly coupled to the multiplexer 15.

FIG. 3 is a flowchart of control of the optical switch 12. This control flow is executed by the control circuit 17. The control circuit 17 first checks whether or not there is an optical input from the side of the node A. For the i-th core (i is an integer of 1 to N) of the N cores (S11), whether or not there is a light incidence from the side of the node A is checked (S12). The presence or absence of light incidence from the i-th core 61 is determined from an output level of the corresponding PD of the optical monitor 18.

Next, for each of the M bands (S13), it is checked whether the j-th band (j is an integer of 1 to M) toward the node B has already been allocated (S14). If the j-th band has already been allocated (YES in S14), the process proceeds to S19 and terminates the current j loop (S19). If the j-th band is available (NO in S14), the connection state of the optical switch 12 is controlled in such a manner that the optical signal from the i-th core 61 of the MCF 60 is output in the direction of the node B as a j-th band optical signal (S15).

The control circuit 17 checks whether or not the j-th band optical signal arrived at the side of the node B is conducted as an expected signal from the node A based on the node information obtained from the network controller 100 (S16). If the j-th band optical signal is not conducted to the node B as the expected signal from the node A (NO in S16), the j loop is terminated (S19), and the control process is abnormally terminated to issue a warning (S20). Disconnection information or warning information of the i-th optical signal may be reported to the network controller 100.

If the j-th band optical signal is conducted to the node B as the expected signal from the node A (YES in S16), the connection destination of the i-th core 61 is determined to be the j-th output, and the loop related to the j-th band is broken (S17). Communication information of the i-th optical signal may be reported to the network controller 100. Thereafter, the loop of the i-th input is terminated (S18), and the connection destination of the (i+1)-th input is controlled (repetition from S11).

According to this control flow, it becomes possible to perform the wavelength conversion on the optical signal transmitted through the MCF 60 by the SDM scheme into an appropriate band, perform band multiplexing, and transmit it in a correct direction via the SCF 70.

Second Embodiment

FIG. 4 is a schematic diagram of an optical node device 20 according to a second embodiment. In the second embodiment, an optical signal is coupled from a non-SDM section to an SDM section. The optical node device 20 converts the optical signal through a path opposite to that in FIG. 1. For example, optical signals in a plurality of different bands transmitted from a node B through an SCF 70 are converted into N sets of optical signals in the same band, and are input to individual N cores 61 of an MCF 60.

The optical node device 20 includes a demultiplexer (denoted by "DEMUX" in the drawing) 25, and demultiplexes the optical signal transmitted through the SCF 70 into optical signals in M different bands. The M bands include a transmission band (e.g., C-band) of the MCF 60. The optical node device 20 includes a maximum of (M−1) wavelength converters, and performs wavelength conversion on the optical signals in (M−1) bands excluding the transmission band of the MCF 60 into optical signals in the transmission band of the MCF 60. In the example of FIG. 2, S-band, L-band, and U-band optical signals are converted into C-band optical signals by wavelength converters 23-1, 23-2, and 23-3 (hereinafter collectively referred to as "wavelength converters 23" as appropriate), respectively.

The optical node device 20 may include an optical connector 29 on the incident side, an optical switch 22, and an optical connector 21 on the emission side. The core 71 of the SCF 70 may be directly coupled to the incident end of the demultiplexer 25 without using the optical connector 29. The output of the optical switch 22 may be coupled to the N cores 61 by the optical connector 21 on the emission side. The optical switch 22 may be used to make a selection regarding which of the N cores 61 the output light of the wavelength converters 23-1, 23-2, and 23-3 and the optical signals not having been subject to the wavelength conversion are to be coupled to. The optical connector 21 or the optical switch 22 may have a fan-in function of N sets of optical signals with respect to each of the cores 61 of the MCF 60.

With the configuration of FIG. 4, it becomes possible to appropriately couple the optical signals from the non-SDM section using the SCF 70 to the SDM section using the MCF 60.

Figure 5:
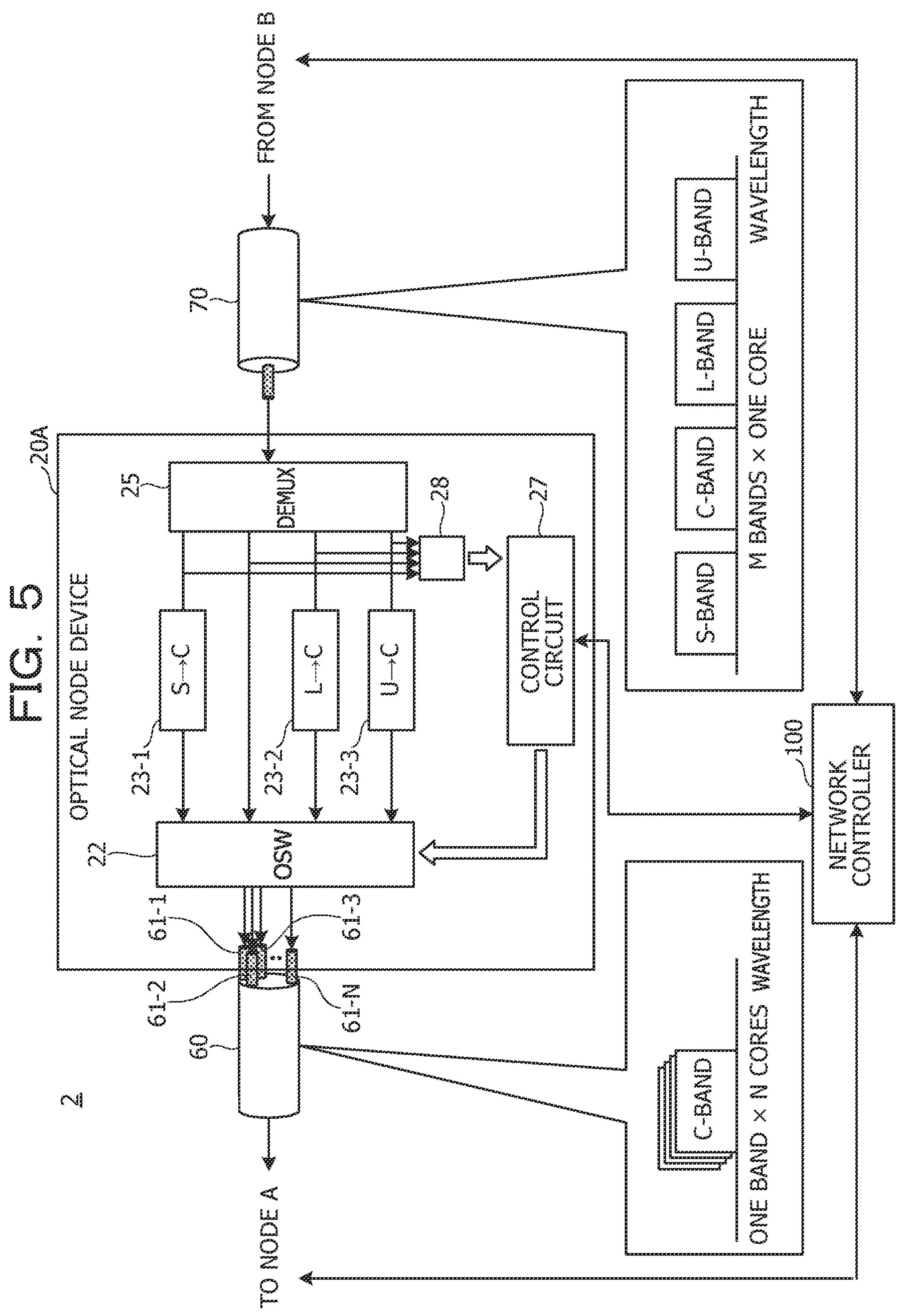
FIG. 5 is a schematic diagram of an optical communication system according to the second embodiment.

FIG. 5 is a schematic diagram of an optical communication system 2 according to the second embodiment. The optical communication system 2 includes an optical node device 20A and a network controller 100. The network controller 100 is coupled to each of nodes included in the optical communication system 2, for example, a node A, a node B, and the optical node device 20A. The optical node device 20A couples optical signals from the non-SDM section to the SDM section. In the drawing, solid line arrows indicate input/output of light, and white arrows indicate input/output of electricity.

The optical node device 20A is coupled between the SCF 70 that transmits optical signals in which M bands of light are multiplexed and the MCF 60 having N cores. The optical node device 20A includes, in addition to the demultiplexer 25 and the maximum of (M−1) wavelength converters 23, the optical switch 22, a control circuit 27 that controls the optical switch 22, and an optical monitor 28.

The demultiplexer 25 demultiplexes the optical signals transmitted through the SCF 70 into M bands. Of the output of the demultiplexer 25, signals in a band that matches the transmission band (e.g., C-band) of the MCF 60 directly enter the optical switch 22 without being subject to the wavelength conversion. Optical signals in a band different from the band of the MCF 60 are subject to the wavelength conversion into the C-band, which is the transmission band of the MCF 60, performed by the individual wavelength converters 23-1, 23-2, and 23-3, and then enter the optical switch 22.

Power of the optical signals in each band is monitored by the optical monitor 28 on the output side of the demultiplexer 25. The control circuit 27 controls the operation of the optical switch 22 based on the monitoring result of the optical monitor 28 and node information obtained from the network controller 100. Under the control of the control circuit 27, it is determined which of the M optical signals incident on the optical switch 22 is coupled to which of the cores 61.

FIG. 6 is a flowchart of control of the optical switch 22. This control flow is executed by the control circuit 27. The control circuit 27 first checks whether there is an optical input from the direction of the node B. For the j-th band (j is an integer of 1 to M) of the M bands (S21), whether or not there is a light incidence from the side of the node B is checked based on the output of the optical monitor 28 (S22). Next, for each of the N cores 61 of the MCF 60 (S23), it is checked whether the i-th core 61 in the direction toward the node A has already been allocated (S24). If the i-th core has already been allocated (YES in S24), the process proceeds to step S29 and terminates the i loop (S29). If the i-th core is available (NO in S24), the connection state of the optical switch 22 is controlled in such a manner that the optical signal included in the j-th band is output in the direction of the node B through the i-th core 61 (S25).

The control circuit 27 checks whether or not the optical signal arrived at the side of the node A through the i-th core 61 is conducted as an expected signal from the node B based on the node information obtained from the network controller 100 (S26). If the optical signal transmitted through the i-th core is not conducted to the node A as the expected signal from the node B (NO in S26), the i loop is terminated (S29), and the control process is abnormally terminated to issue a warning (S30). Non-conduction or warning information of the j-th optical signal may be reported to the network controller 100.

If the optical signal transmitted through the i-th core 61 is conducted to the node A as the expected signal from the node B (YES in S26), the connection destination of the optical signal corresponding to the j-th band is determined to be the i-th core, and the loop related to the i-th core is broken (S27). Communication information of the j-th optical signal may be reported to the network controller 100. Thereafter, the loop of the j-th optical signal is terminated (S28), and the connection destination of the (j+1)-th optical signal is controlled (repetition from S21).

According to this control flow, it becomes possible to couple the optical signal having been subject to the band multiplexing and transmitted through the SCF 70 to the appropriate core 61 of the MCF 60, and transmit it in the correct direction by the SDM scheme.

Third Embodiment

Figure 7:
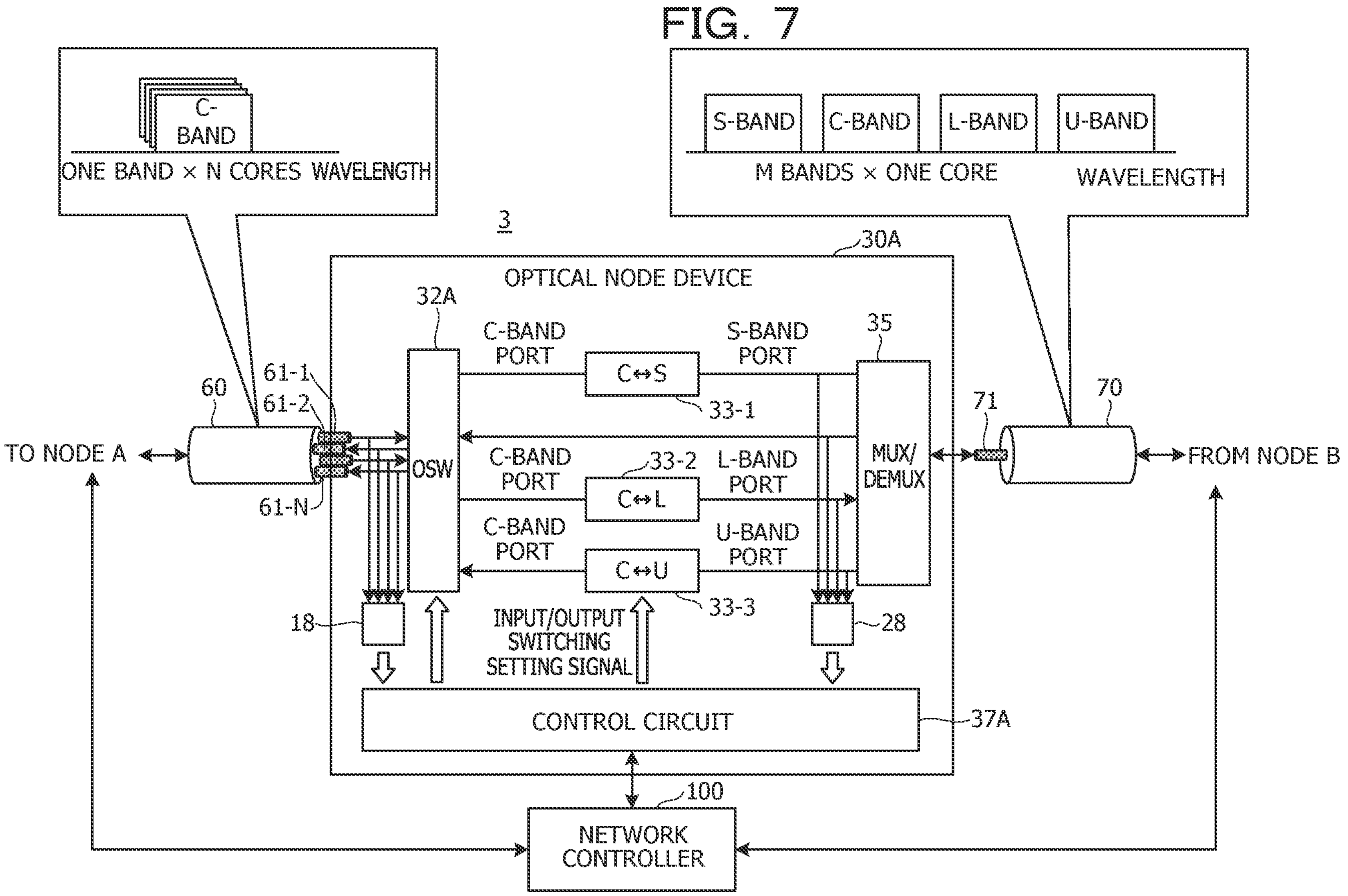
FIG. 7 is a schematic diagram of an optical communication system according to a third embodiment.

FIG. 7 is a schematic diagram of an optical communication system 3. The optical communication system 3 carries out bidirectional optical transmission between an SDM section and a non-SDM section. In a case of performing the bidirectional optical transmission between the SDM section and the non-SDM section, a configuration in which the optical node device 10 according to the first embodiment and the optical node device 20 according to the second embodiment are simply included in one optical node device may be adopted. In this case, an optical transmission path from a node A to a node B and an optical transmission path from the node B to the node A are used in a pair. On the other hand, in the third embodiment, a plurality of cores 61 included in an MCF 60 is used to spatially distinguish between transmission from the node A to the node B and transmission from the node B to the node A. In transmission through an SCF 70, the transmission from the node A to the node B and the transmission from the node B to the node A may be carried out in a time-division manner.

The optical communication system 3 includes an optical node device 30A and a network controller 100. The network controller 100 is coupled to each of nodes included in the optical communication system 3, for example, the node A, the node B, and the optical node device 30A. The optical node device 30A bidirectionally couples optical signals between the non-SDM section and the SDM section. In the drawing, solid line arrows indicate input/output of light, and white arrows indicate input/output of electricity.

The optical node device 30A is coupled between the MCF 60 having N (N is an even number of 2 or more) cores 61 and the SCF 70 having one core 71. A part, for example, a half (N/2) of the N cores 61 of the MCF 60 is used for the transmission in the direction from the node A toward the node B, and a part or all of the remaining cores is used for the transmission in the direction from the node B toward the node A. In a case of a node configuration of equal to or more than three paths, for example, some of the remaining cores may be allocated to a third traffic toward the node C.

The optical node device 30A includes an optical switch 32A, a maximum of (M−1) wavelength converters 33-1, 33-2, and 33-3, a multiplexer-demultiplexer 35, a control circuit 37A, and optical monitors 18 and 28. Each of the wavelength converters 33-1, 33-2, and 33-3 (collectively referred to as "wavelength converters 33" as appropriate) carries out bidirectional wavelength conversion between the transmission band (C-band) of the MCF 60 and a band different from the transmission band. The multiplexer-demultiplexer 35 demultiplexes the optical signals transmitted through the SCF 70 from the direction of the node B into optical signals in M bands. The multiplexer-demultiplexer 35 also multiplexes the optical signals having been entered the optical node device 30A from the direction of the node A and subject to the wavelength conversion into the corresponding band together with the optical signals not having been subject to the wavelength conversion.

The optical monitor 18 monitors power of the optical signals emitted from each of the cores 61 between the output of each of the cores 61 of the MCF 60 and the optical switch 32A. The optical monitor 28 monitors power of the optical signals in individual bands between the multiplexer-demultiplexer 35 and the wavelength converters 33.

The control circuit 37A controls the optical switch 32A and the wavelength converters 33 in such a manner that the connection relation of the optical signals in the direction from the node A toward the node B and the connection relation of the optical signals in the direction from the node B toward the node A are correctly established. The control circuit 37A monitors bidirectional inputs using the monitoring result of the optical monitor 18 and the monitoring result of the optical monitor 28, and controls the input/output direction and the connection of the optical switch 32A and the wavelength converters 33 using node information obtained from the network controller 100. As will be described later, the control circuit 37A supplies an input/output switching setting signal to each of the wavelength converters 33 to switch an input port and an output port of the optical signals in each band. Under the control of the control circuit 37A, it becomes possible to achieve the bidirectional connection between the SDM section and the non-SDM section.

FIG. 8 is a schematic diagram of the wavelength converter 33 used in the optical communication system 3. The wavelength converter 33 carries out the bidirectional wavelength conversion between a band X and a band Y. The wavelength converter 33 collectively converts optical signals of a large number of wavelengths included in the band X or the band Y into optical signals in the band Y or the band X. Depending on the optical transmission direction, one of the band X and the band Y becomes signal light to enter the wavelength converter 33, and the other one becomes converted light or idler light to be output from the wavelength converter 33.

The wavelength converter 33 includes an input/output switching unit 310, a filter 320, and a wavelength conversion unit 330. The wavelength conversion unit 330 includes an excitation light source 331, a polarization separator 332, non-linear waveguides 333 and 334, and a polarization synthesizer 335. The signal light (e.g., signal light in the band X) that has entered the wavelength conversion unit 330 enters the non-linear waveguides 333 and 334 together with the excitation light output from the excitation light source 331, thereby being converted into light in a wavelength band (e.g., band Y) different from both the excitation light and the signal light.

The signal light that has entered the wavelength conversion unit 330 is separated into two polarized waves in which vibration directions of electric fields are orthogonal to each other by the polarization separator 332. Likewise, the excitation light output from the excitation light source 331 is also separated into two polarized waves orthogonal to each other by the polarization separator 332. For example, the first polarized wave of the excitation light and the signal light enters the non-linear waveguide 333, and the second polarized wave enters the non-linear waveguide 334, for example. In each of the non-linear waveguides 333 and 334, idler light of a new wavelength is generated by interaction between the excitation light and the signal light and a non-linear optical medium. Note that, since the non-linear waveguides 333 and 334 commonly have polarization dependency, it is desirable to make an arrangement or a connection in such a manner that polarization states of signal light and excitation light incident on each of the waveguides efficiently interact with each other in each of the waveguides.

The respective polarized waves emitted from the non-linear waveguides 333 and 334 are synthesized by the polarization synthesizer 335, and enter the filter 320. The filter 320 removes residual excitation light included in the synthesized light, and allows the signal light and the idler light (converted light) to pass therethrough.

The input/output switching unit 310 switches the input/output direction of the light in the band X and the light in the band Y based on the input/output switching setting signal supplied from the control circuit 37A. The input/output switching unit 310 includes a 2×1 optical switch 311 (which is referred to as an "optical switch A"), a 2×1 optical switch 312 (which is referred to as an "optical switch B"), a 2×1 optical switch 313 (which is referred to as an "optical switch C"), and a decode/drive circuit 315.

One terminal of the optical switch 311 is an input or an output of the band Y port, one port a1 of two terminals is coupled to an output of the filter 320, and another port a2 is coupled to one input port c1 of the optical switch 313. One terminal of the optical switch 312 is an input or an output to the band X port, one port b1 of two terminals is coupled to the output of the filter 320, and another port b2 is coupled to another input port c2 of the optical switch 313. An output port c0 of the optical switch 313 is coupled to an input of the wavelength conversion unit 330.

The decode/drive circuit 315 switches input/output of the 2×1 optical switches 311, 312, and 313 according to the input/output switching setting signal received from the control circuit 37A and a switching condition determined in advance.

FIG. 9 illustrates an exemplary setting of input/output switching of the wavelength converter 33. Depending on the transmission direction, there may be a case where the band X is set as an input to the wavelength converter 33 and the band Y is set as an output of the wavelength converter 33, and a case where the band Y is set as an input to the wavelength converter 33 and the band X is set as an output of the wavelength converter 33.

In the conversion from the band X to the band Y, the port a1 of the 2×1 optical switch 311 (optical switch A) is coupled to the band Y port, and the port b2 of the 2×1 optical switch 312 (optical switch B) is coupled to the band X port. At this time, the port c2 of the 2×1 optical switch 313 (optical switch C) is coupled to the port c0, and the optical signal in the band X is input to the wavelength conversion unit 330. According to this setting, the optical signal in the band X incident on the wavelength converter 33 is converted into an optical signal in the band Y, and is output from the wavelength converter 33.

In the conversion from the band Y to the band X, the port a2 of the 2×1 optical switch 311 (optical switch A) is coupled to the band Y port, and the port b1 of the 2×1 optical switch 312 (optical switch B) is coupled to the band X port. At this time, the port c1 of the 2×1 optical switch 313

(optical switch C) is coupled to the port c0, and the optical signal in the band Y is input to the wavelength conversion unit 330. According to this setting, the optical signal in the band Y incident on the wavelength converter 33 is converted into an optical signal in the band X, and is output from the wavelength converter 33.

The decode/drive circuit 315 sets the connection state of the 2×1 optical switches 311, 312, and 313 as described above based on the input/output switching setting signal from the control circuit 37A. With this configuration, the bidirectional wavelength conversion may be carried out by each of the wavelength converters 33.

Figure 10:
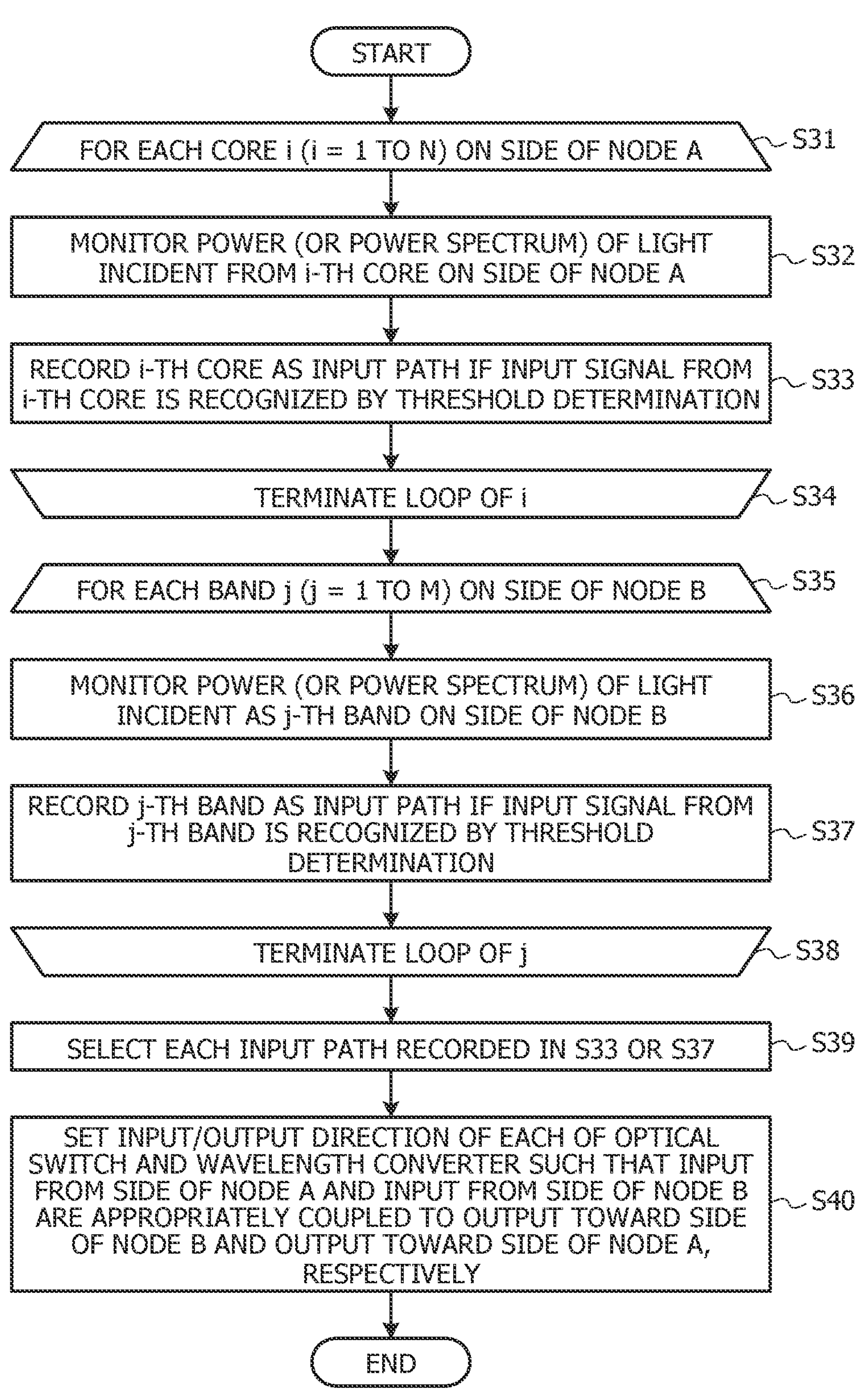
FIG. 10 is a flowchart of optical switch control of the system in FIG. 7.

FIG. 10 is a flowchart of control of the optical switch 32A implemented in the optical communication system 3. Presence or absence of light incidence from each of the N cores 61 on the side of the node A is checked. First, attention is focused on the i-th (i is an integer of 1 to N, and N is an even number) core 61 (S31), and power (or power spectrum) of the light incident on the optical node device 30A from the i-th core 61 is examined based on the monitoring result of the optical monitor 18 (S32). If a level of this optical power is equal to or higher than a threshold and an input optical signal from the i-th core 61 is recognized, the i-th core 61 is recorded as an input path (S33). The value of i is sequentially incremented, the core 61 in which the input optical signal is recognized is set as the input path, and the i loop is terminated when the identification of the input path is complete for all the cores 61 (S34).

The presence or absence of light incidence is checked for each of the M bands on the side of the node B. First, attention is focused on the j-th (j is an integer of 1 to M) band (S35), and power (or power spectrum) of the light incident on the optical node device 30A as an optical signal in the j-th band is examined based on the monitoring result of the optical monitor 28 (S36). If a level of this optical power is equal to or higher than a threshold and an input optical signal in the j-th band is recognized, the j-th band is recorded as an input path. The value of j is sequentially incremented, and the band in which the input optical signal is recognized is set as the input path (S37). When the identification of the input path is complete for all the bands, the j loop is terminated (S38). The process of the i loop and the process of the j loop may be performed simultaneously, or either one may be performed first. The presence or absence of the input optical signal from the SCF 70 may be determined by a time-division scheme.

The input path from the direction of the node A recorded in S33 and the input path from the direction of the node B recorded in S37 are selected (S39). The input/output direction of the optical switch 32A and each of the wavelength converters 33 is set in such a manner that the input path on the side of the node A is coupled to the output directed toward the node B and the input path on the side of the node B is coupled to the output directed toward the node A (S40).

Figure 11:
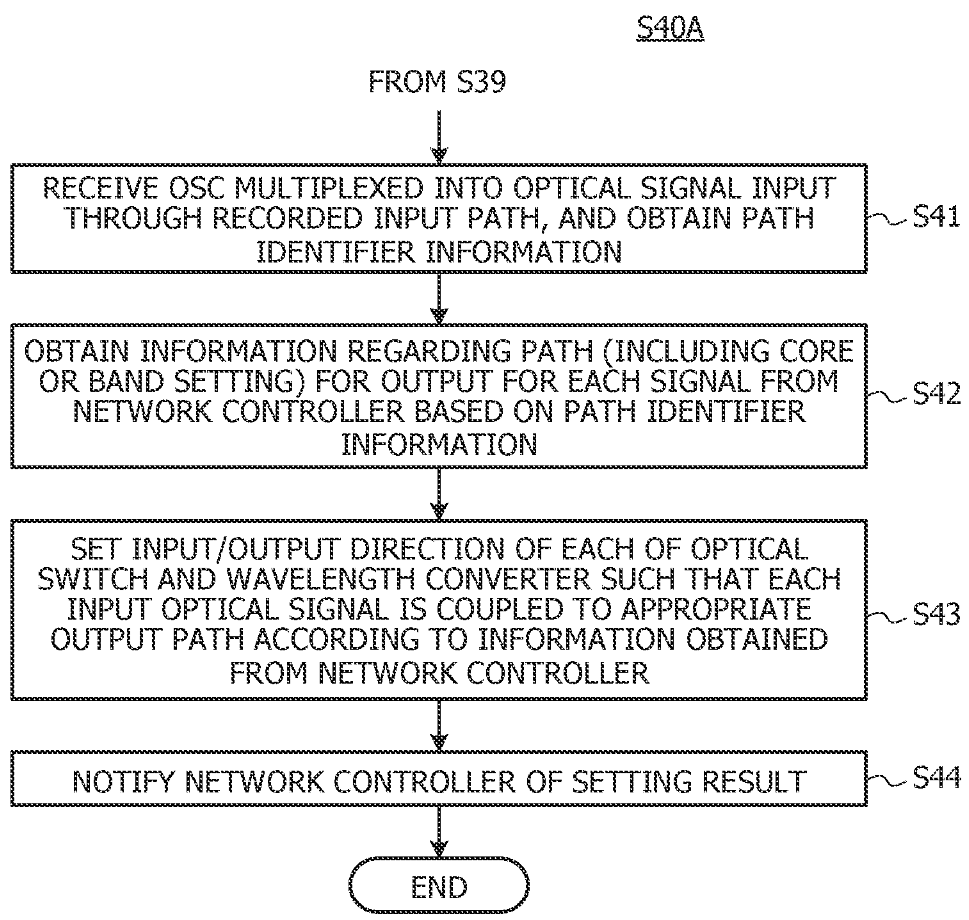
FIG. 11 is a diagram illustrating an exemplary setting process in step S40 in FIG. 10.

FIG. 11 illustrates a specific process of step S40 in FIG. 10. This process is referred to as step S40A. An optical supervisory channel (OSC) multiplexed into the optical signal input through each of the recorded input paths is received, and path identifier information is obtained from the OSC (S41). Information regarding the path in the expected output direction of the optical node device 30A is obtained from the network controller 100 for each of the input optical signals based on the path identifier information (S42). The output path information may include a number of the core 61 to which the input optical signal is to be coupled, or a number of the band.

According to the information obtained from the network controller 100, the input/output direction of the optical switch 32A and each of the wavelength converters 33 is set such that each input optical signal is coupled to an appropriate output path (S43). The network controller 100 is notified of the setting result (S44), and the process of S40A is terminated.

Figure 12:
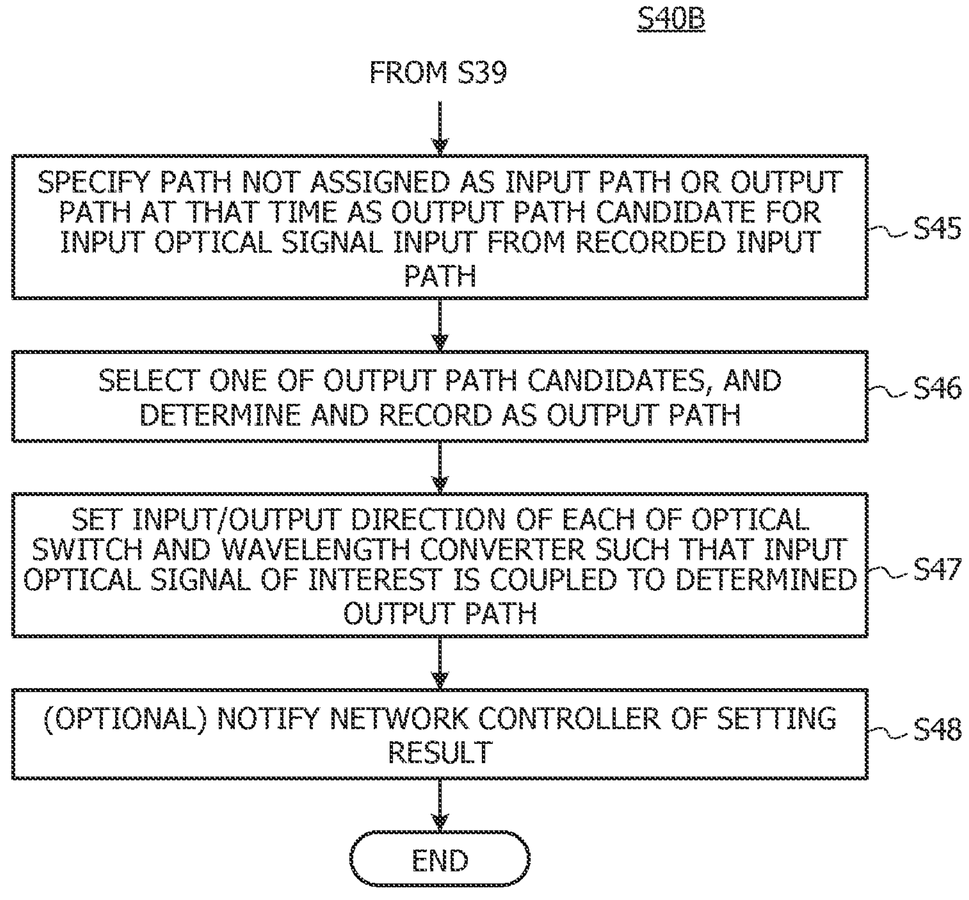
FIG. 12 is a diagram illustrating another exemplary setting process in step S40 in FIG. 10.

FIG. 12 illustrates another exemplary process of step S40 in FIG. 10. This process is referred to as step S40B. In S40B, the optical node device 30A autonomously determines connection of optical signals without depending on the network controller 100. First, for each of the optical signals input through the recorded input path, a path not assigned as an input path or an output path at that time is specified as a candidate for the output path (S45). One of the output path candidates is selected, and the selected path is determined and recorded as the output path (S46). The input/output direction of the optical switch 32A and each of the wavelength converters 33 is set such that the input optical signal of interest is coupled to the determined output path (S47). As an option, the network controller 100 may be notified of the setting result (S48). Thereafter, the process of S40B is terminated.

<First Variation of Bidirectional Optical Transmission>

FIG. 13 illustrates a first variation of the bidirectional optical transmission between the SDM section and the non-SDM section. An optical node device 30B is coupled between the MCF 60 having the N (N is an integer of 2 or more) cores 61 and two SCFs 70-1 and 70-2. A part, for example, a half (N/2) of the N cores 61 of the MCF 60 is used for the transmission in the direction from the node A toward the node B, and a part, for example, a half (N/2) of the remaining cores is used for the transmission in the direction from the node B toward the node A. For example, the SCF 70-1 is used for the transmission in the direction from the node A toward the node B, and the SCF 70-2 is used for the transmission in the direction from the node B toward the node A. Since the two SCFs 70-1 and 70-2 are used, the number of bands multiplexed in each SCF 70 may be M/2. With this configuration, time-division operation in the non-SDM section is not needed.

The optical node device 30B includes an optical switch 32B, at least two wavelength converters 13 and 23, a multiplexer 34, a demultiplexer 36, a control circuit 37B, and optical monitors 18 and 28. The wavelength converter 13 converts a signal in the MCF transmission band (e.g., C-band) into an optical signal in a band different from the C-band in the direction from the node A toward the node B. The wavelength converter 23 converts an optical signal in a band different from the MCF transmission band (e.g., C-band) into an optical signal in the C-band in the direction from the node B toward the node A.

The multiplexer 34 multiplexes the optical signals having been subject to the wavelength conversion and the optical signals not having been subject to the wavelength conversion in the direction from the node A toward the node B. The optical signals including light in a plurality of bands multiplexed by the multiplexer 34 is input to the SCF 70-1. The demultiplexer 36 demultiplexes the optical signals transmitted through the SCF 70-2 from the direction of the node B into optical signals in a plurality of bands. Some of the demultiplexed optical signals directly enter the optical switch 32B without being subject to the wavelength conversion, and other optical signals are subject to the wavelength conversion into the MCF transmission band (e.g., C-band) and enter the optical switch 32B.

The optical switch 32B directly couples some of the optical signals in the C-band transmitted by a part in the direction from the node A, for example, through the N/2 cores 61, to the input of the multiplexer 34, and couples other optical signals to the input of the wavelength converter 13. The optical switch 32B also couples the output of the wavelength converter 23 and the output of the demultiplexer 36 not subject to the wavelength conversion to a part of the remaining part, for example, any of the N/2 cores.

The control circuit 37B controls the connection state of the optical switch 32B based on the monitoring results of the optical monitors 18 and 28 and the node information obtained from the network controller as appropriate. In this configuration, a transmission path from the node A toward the node B and a transmission path from the node B toward the node A are distinguished. There is no possibility of collision between the optical signals bidirectionally incident on the optical node device 30B, and the optical switch 32B is easily controlled. Under the control of the control circuit 37B, it becomes possible to achieve the bidirectional connection between the SDM section and the non-SDM section.

<Second Variation of Bidirectional Optical Transmission>

FIG. 14 illustrates a second variation of the bidirectional optical transmission between the SDM section and the non-SDM section. The second variation is obtained by generalizing optical signal transfer between the SDM section and the non-SDM section. Furthermore, band multiplexing is permitted in the SDM section using the MCF.

An optical node device 40 is coupled between L (L is an integer of 1 or more) MCFs 60-1 to 60-L (collectively referred to as "MCFs 60" as appropriate) and R (R is an integer of 1 or more) SCFs 70-1 to 70-R (collectively referred to as "CSFs 70" as appropriate). Each of the MCFs 60 has N (N is an even number of 2 or more) cores 61. Some of the N cores, for example, N/2 cores 61 may be used for optical transmission in the direction from the node A toward the node B, and some of the remaining cores, for example, N/2 cores 61 may be used for optical transmission in the direction from the node B toward the node A. Each of the cores 61 of each of the MCFs 60 transmits optical signals including signals in K (K is an integer of 1 or more) bands.

Each of the SCFs 70 transmits optical signals in which optical signals in P (P is an integer of 2 or more) bands are multiplexed. The number R of the SCFs 70 is expressed as follows using the number K of bands for transmitting the MCFs 60, the number N of cores, the number L of the MCFs 60, and the number P of bands of the SCFs 70.

$$R = K \times N \times L / P$$

The optical node device 40 includes an optical switch 42, a maximum of (P−1) wavelength converters 43, R multiplexer-demultiplexers 45-1 to 45-R, a control circuit 47, and optical monitors 18 and 28. The wavelength conversion is not applied to at least one band of the K bands included in the output optical signals of each of the MCFs 60. The wavelength conversion is not applied to at least one band of the P bands included in the output optical signals of each of the SCFs 70. The control circuit 47 supplies input/output switching setting signals to the individual wavelength converters 43 to control the input/output states of the wavelength converters 43. The control circuit 47 also controls the input/output and the connection relation of the optical switch 42. The control circuit 47 determines which core of which MCF 60 and which band of which SCF 70 are coupled in which direction based on the monitoring results of the optical monitors 18 and 28 and the node information (communication state, etc.) obtained from the network controller, and makes determination. Under the control of the control circuit 47, it becomes possible to achieve the bidirectional connection between the SDM section and the non-SDM section. Note that, while the optical node device 40 in FIG. 14 is illustrated such that all of the MCFs 60-1 to 60-L reach the node A and all of the SCFs 70-1 to 70-R reach the node B, it is not necessarily limited thereto, and it may be used in a network in which some of the MCFs 60-1 to 60-L reach another node (e.g., node C) or some of the SCFs 70-1 to 70-R reach still another node (e.g., node D).

<Other Variations>

Figure 15:
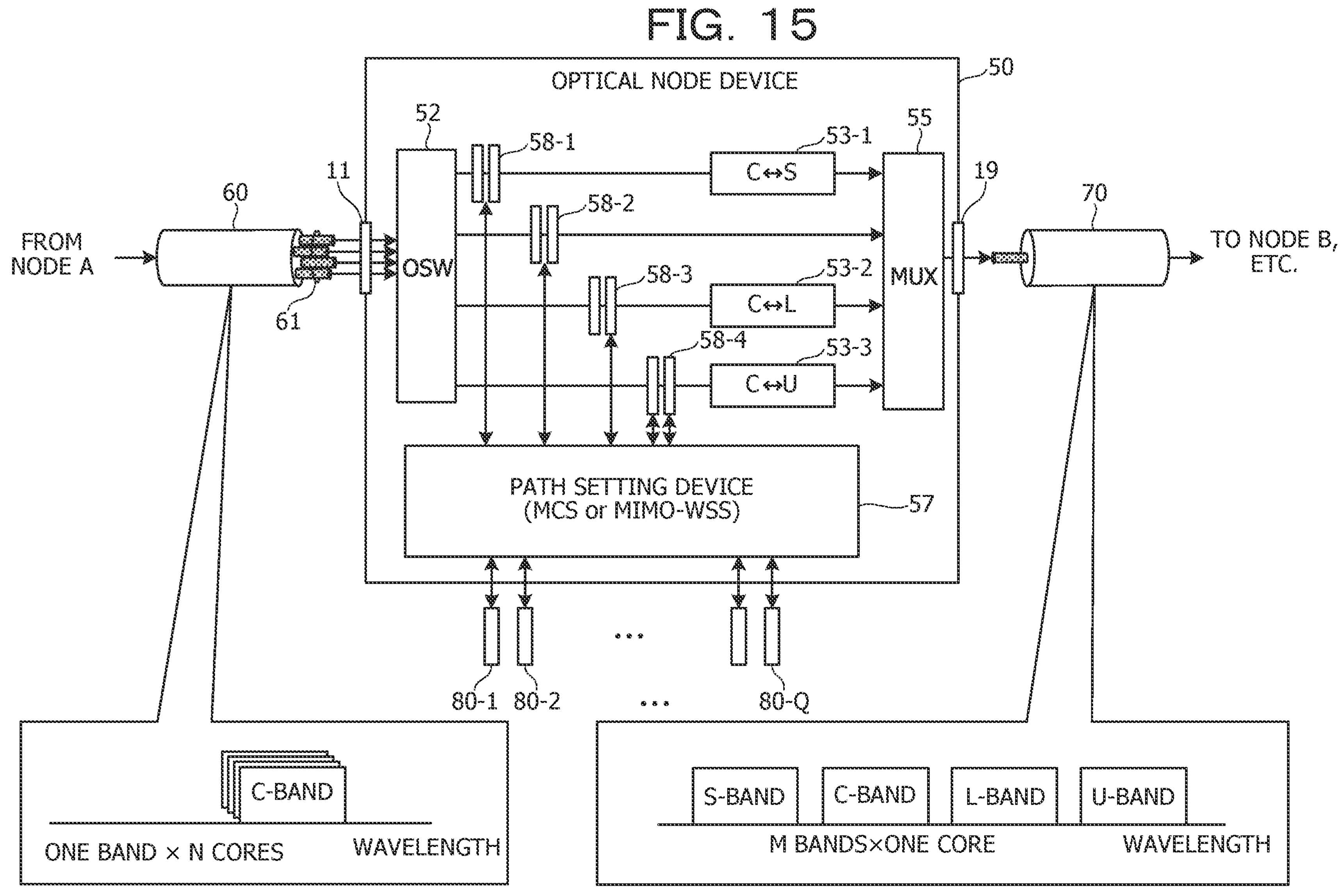
FIG. 15 is a diagram illustrating another variation.

FIG. 15 illustrates, as another variation, a configuration in which a reconfigurable optical add-drop multiplexer (ROADM) is incorporated in an optical node device. An optical node device 50 is coupled between the MCF 60 having the N cores 61 and the SCF 70 that transmits optical signals in which signals in M bands are multiplexed. M is equal to N, or larger than N. Here, it is set as N=4 and M=4.

The optical node device 50 includes an optical switch 52, a maximum of (M−1) wavelength converters 53-1, 53-2, and 53-3 (collectively referred to as "wavelength converters 53" as appropriate), a multiplexer 55, a path setting device 57, N ROADMs 58-1 to 58-N (collectively referred to as "ROADMs 58" as appropriate). Although a control circuit electrically coupled to the optical switch 52 is not illustrated for convenience of space of paper, a control circuit coupled to the optical switch 52 or the wavelength converters 53 is provided in a similar manner to FIGS. 1, 5, and 7. Although it is not indispensable, an optical connector 11 and an optical connector 19 may be used. The ROADMs 58 may have a colorless, directionless and contentionless (CDC) function. In this case, wavelength independence, direction independence, and collision avoidance are achieved.

Each of the ROADMs 58 is coupled to the path setting device 57. The path setting device 57 is, for example, a multicast switch (MCS) or a multi-input multi-output wavelength selective switch (MIMO-WSS). A plurality of transponders 80-1 to 80-Q (collectively referred to as "transponders 80" as appropriate) is coupled to the path setting device 57. Each of the transponders 80 transmits and receives optical signals in one band.

Each of the ROADMs 58 drops a signal of a predetermined wavelength included in the optical signals transmitted through the corresponding core 61, and adds an optical signal of a predetermined wavelength transmitted from the transponder 80.

With an optical circuit forming the ROADM being inserted between the optical switch 52 and the wavelength converter 53, optical add-drop may be implemented by an existing device supporting the transmission band (e.g., C-band) of the MCF 60. While the ROADMs are incorporated in the optical transmission in the direction from the node A toward the node B in FIG. 15, the configuration incorporating the ROADMs is also applicable to the optical transmission in the direction from the node B toward the node A as in the second embodiment and to the bidirectional optical transmission according to the third embodiment.

Although the optical node device and the optical communication system have been described above based on the specific configuration examples, the present disclosure is not limited to the configurations described above. At the time of making the bidirectional connection between the SDM section and the non-SDM section, the power of the optical signals output from the optical node device may be also monitored in addition to the power of the optical signals input to the optical node device, and whether the light in each band is incident light or emission light may be determined to improve the accuracy of the input/output setting or the connection setting. When a situation where input optical signals collide with each other is detected as a result of switching the connection state of the optical switch under the control of the control circuit, the network controller 100 may be notified of a warning, and the process may be abnormally terminated. While a dense WDM (DWDM) signal is assumed as an optical signal in each band in the descriptions above, the optical node device according to the present disclosure is also applicable to seamless connection between coarse WDM (CWDM) transmission and parallel transmission of multicore single channels.

As a use case of the present disclosure, it is also applicable to, in addition to seamless connection between a metro network and a core network, seamless connection between a land network and a submarine non-relay section, seamless connection between a network in a data center and a network between data centers, and the like. In the core network, the land network, and the network in the data center, the SDM is considered to advance earlier than in the metro network, the submarine non-relay section, and the network between the data centers from the view point of an increase in traffic demand and ease of construction. According to the optical node device and the optical communication system according to the embodiments, it becomes possible to implement seamless connection with the SDM section without increasing the number of SCFs in the non-SDM section to N times.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical node device comprising:

an optical switch coupled to a multicore fiber that has N (N is an integer of 2 or more) cores;

a multiplexer-demultiplexer coupled to a single-core fiber that multiplexes and transmits optical signals in M (M is an integer of 2 or more; and M≤N) bands;

a maximum of (M−1) wavelength converters provided between the optical switch and the multiplexer-demultiplexer; and a control circuit that controls the optical switch or the wavelength converter or both of the optical switch and the wavelength converter, wherein the control circuit controls the optical switch or the wavelength converter or both of the optical switch and the wavelength converter such that, of the optical signals in the M bands, an optical signal in at least one band is not subject to wavelength conversion and an optical signal in another band is subject to the wavelength conversion by the wavelength converters.

2. The optical node device according to claim 1, wherein the M bands include a first band that is a transmission band of the multicore fiber, and the control circuit controls the optical switch or the wavelength converter or both of the optical switch and the wavelength converter such that the optical signal in the first band is not subject to the wavelength conversion.

3. The optical node device according to claim 1, further comprising:

a first optical monitor that is provided between the N cores and the optical switch and monitors power of input optical signals that enter the optical node device from the N cores, wherein the control circuit controls the optical switch such that, of the input optical signals incident from the N cores, an optical signal other than a first optical signal not subject to the wavelength conversion is coupled to any one of the wavelength converters based on a monitoring result of the first optical monitor.

4. The optical node device according to claim 3, wherein the multiplexer-demultiplexer multiplexes the first optical signal and a second optical signal output from the wavelength converter, and inputs the multiplexed signal to the single-core fiber.

5. The optical node device according to claim 1, further comprising:

a second optical monitor that is provided between the multiplexer-demultiplexer and the wavelength converter and monitors power of the optical signals in the M bands demultiplexed by the multiplexer-demultiplexer, wherein the control circuit controls the optical switch such that, of the optical signals in the M bands, a first optical signal not subject to the wavelength conversion and a second optical signal output from the wavelength converter to any one of the N cores based on a monitoring result of the second optical monitor.

6. The optical node device according to claim 1, further comprising:

a first optical monitor that monitors power of an optical signal that passes between the N cores and the optical switch; and a second optical monitor that monitors power of an optical signal that passes between the multiplexer-demultiplexer and the wavelength converter, wherein the control circuit controls input and output of the optical switch and the wavelength converter such that some of the N cores are used for optical transmission from the multicore fiber toward the single-core fiber and a part or all of the remaining cores of the N cores are used for optical transmission from the single-core fiber toward the multicore fiber based on a monitoring result of the first optical monitor and the second optical monitor.

7. The optical node device according to claim 6, further comprising:

a first multiplexer-demultiplexer coupled to a first single-core fiber that multiplexes and transmits optical signals in a part of the M bands; and a second multiplexer-demultiplexer coupled to a second single-core fiber that multiplexes and transmits optical signals in another part of the M bands, wherein the control circuit controls the input and the output of the optical switch and the wavelength converter such that some of the N cores are used for optical transmission from the multicore fiber to the first single-core fiber and a part or all of the remaining cores of the N cores are used for optical transmission from the second single-core fiber to the multicore fiber.

8. The optical node device according to claim 1, further comprising:

N optical add-drop multiplexers provided between the optical switch and the wavelength converter; and a path setting device coupled to the N optical add-drop multiplexers.

9. An optical communication system comprising:

the optical node device according to claim 1; and a network controller, wherein the control circuit obtains, from the network controller, information that indicates a conduction state of a first node in a direction of the multicore fiber and a second node in a direction of the single-core fiber, and controls the optical switch or the wavelength converter or both of the optical switch and the wavelength converter based on the obtained information.

10. The optical communication system according to claim 9, wherein the optical node device performs mutual conversion between an optical signal of a first scheme transmitted through the multicore fiber by space division multiplexing and an optical signal of a second scheme transmitted through the single-core fiber by band multiplexing.

11. The optical communication system according to claim 10, wherein the optical node device notifies the network controller of an input and output setting result of the optical switch or the wavelength converter or both of the optical switch and the wavelength converter.

12. A wavelength conversion circuit comprising:

a plurality of switches provided to correspond to a plurality of individual bands to switch input and output of a port;

a polarization separator that separates an optical signal in a first band input from the switch set on an input side of the port into a plurality of polarized waves;

a plurality of waveguides that respectively transmits optical signals that correspond to the plurality of polarized waves; and a polarization synthesizer that synthesizes the optical signals of the plurality of waveguides, wherein an optical signal in a second band different from the first band output from the polarization synthesizer is output from the switch that is set on an output side of the port and corresponds to the second band.

* * * * *